J. CHAMPLIN.
Tire-Tightening Machine.
No. 167,303. Patented Aug. 31, 1875.
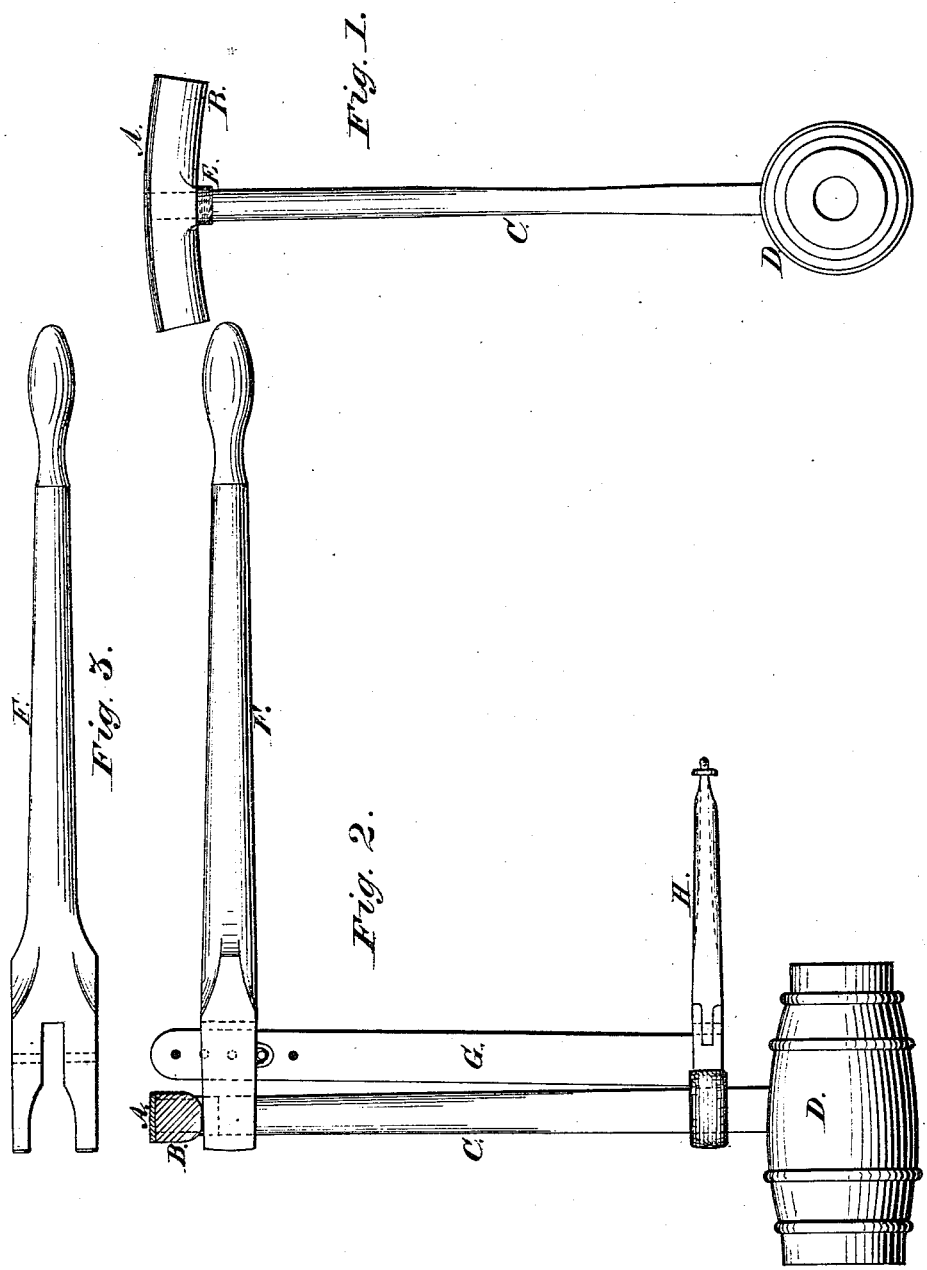

UNITED STATES PATENT OFFICE.

JONATHAN CHAMPLIN, OF PENN YAN, NEW YORK.

IMPROVEMENT IN TIRE-TIGHTENING MACHINES.

Specification forming part of Letters Patent No. 167,303, dated August 31, 1875; application filed August 5, 1875.

*To all whom it may concern:*

Be it known that I, JONATHAN CHAMPLIN, of Penn Yan, in the county of Yates and State of New York, have invented a Tire - Tightening Machine, of which the following is a specification:

The object of my invention is to tighten the tire on a wagon - wheel by raising the felly from the shoulder of the spokes and placing a washer around the tenon of the spoke so that it will remain between the shoulder and felly, thus expanding the felly until the tire becomes tight, and when the wheel is felly-bound, raise the felly and put on the necessary washers, and thus tightening the spokes; also, when spokes are loose in the hub, my machine will clasp the spoke near the hub, so that the felly may be raised and a washer applied, and thus tighten the spoke in the hub, as shown in the accompanying drawing, in which—

Figure 1 is a view of the hub, spoke, section of felly, and washer. Fig. 2 is a side view of my invention applied to a wheel, and Fig. 3 the lever.

A, B, C, and D are the tire, felly, spoke, and hub of a wheel constructed in any ordinary manner. E is the washer. It may be made of leather or other material, with the hole through to suit the size of the tenon of the spoke. It is to be applied to and be cut from the hole to the periphery, so that it may be placed on the spoke, as shown in Fig. 1. F is a forked lever. The fork must be made large enough for the washer to be put in place while it holds the felly from the shoulder of the spoke. It is held in place by the fulcrum G, and is actuated by the operator. Its shape is represented in Fig. 3. G is the fulcrum. One end is made to slide freely into the mortise through the lever. This end has a series of holes for a pin or bolt for the lever to rest upon. These holes allow the fulcrum to be suited to various-sized wheels. The other end is made to rest upon the hub when the spokes are tight in the hub, or upon the tongs when the spoke is loose in the hub. H is the tongs, to be put on the spoke when it is loose in the hub for the fulcrum G to rest upon. They must be made large enough to have the clasping-points covered with leather or other suitable substance, so as to prevent injury to the paint on the spokes. The handles may be any length desired, and must be provided with a clasp that will hold them together, so that the tongs may be applied to any sized spoke, and fastened while the felly is being raised and the washer applied.

Having thus fully described my invention, what I claim as new, and desire to secure by Letters Patent, is—

In a tire - tightener, the forked lever F, in combination with the fulcrum G and tongs H, all substantially as and for the purpose set forth.

JONATHAN CHAMPLIN.

Witnesses:
 JOHN L. LEWIS,
 CHARLES KETCHUM.